(12) United States Patent  
Baramov (10) Patent No.: US 8,897,125 B2  
(45) Date of Patent: Nov. 25, 2014

(54) COMMUNICATION FAILURE TOLERANT DISTRIBUTED KALMAN FILTER

(75) Inventor: Lubomir Baramov, Praha (CZ)

(73) Assignee: Honeywell International Inc., Morristown, NJ (US)

( * ) Notice: Subject to any disclaimer, the term of this patent is extended or adjusted under 35 U.S.C. 154(b) by 366 days.

(21) Appl. No.: 13/479,152

(22) Filed: May 23, 2012

(65) Prior Publication Data

US 2012/0300613 A1 Nov. 29, 2012

(30) Foreign Application Priority Data

May 23, 2011 (EP) ..................................... 11167187

(51) Int. Cl.
*H04L 1/00* (2006.01)
*G05B 9/02* (2006.01)

(52) U.S. Cl.
CPC ........................................ *G05B 9/02* (2013.01)
USPC .......... 370/216; 370/242; 370/252; 455/456.1

(58) Field of Classification Search
USPC .................. 370/216, 242, 252; 455/456.1
See application file for complete search history.

(56) References Cited

U.S. PATENT DOCUMENTS

| | | | | |
|---|---|---|---|---|
| 7,714,643 | B1 * | 5/2010 | Wang et al. | 327/553 |
| 7,720,642 | B2 * | 5/2010 | Brodie | 702/185 |
| 2012/0106428 | A1 * | 5/2012 | Schlicht et al. | 370/312 |
| 2012/0196622 | A1 * | 8/2012 | Faragher | 455/456.1 |
| 2012/0294181 | A1 * | 11/2012 | Ekelin et al. | 370/252 |

OTHER PUBLICATIONS

"European Application Serial No. 11167187.1, Response filed Jun. 29, 2012 to Office Action mailed Mar. 26, 2012", 11 pgs.
"European Application Serial No. 11167187.1, Office Action mailed Mar. 26, 2012", 4 pgs.
"European Application Serial No. 11167187.1, Supplemental Search Report mailed Jan. 18, 2012", 3 pgs.
Carli, R., et al., "Distributed Kalman filtering using consensus strategies", 2007 46th IEEE Conference on Decision and Control, (2007), 5486-5491.
Hashemipour, H. R, et al., "Decentralized structures for parallel Kalman filtering", IEEE Transactions on Automatic Control, 33(1), (1988), 88-94.
Khan, U. A, et al., "Distributed Kalman Filters in Sensor Networks: Bipartite Fusion Graphs", IEEE/SP 14th Workshop on Statistical Signal Processing, 2007. SSP '07, 700-704.
Khan, U. A, et al., "Distributing the Kalman Filter for Large-Scale Systems", IEEE Transactions on Signal Processing, 56(10), (2008), 4919-4935.
Olfati-Saber, R., et al., "Consensus problems in networks of agents with switching topology and time-delays", IEEE Transactions on Automatic Control, 49(9), (2004), 1520-1533.

(Continued)

*Primary Examiner* — Wanda Z Russell
(74) *Attorney, Agent, or Firm* — Schwegman Lundberg & Woessner, P.A.

(57) ABSTRACT

A method and system include a distributed network of filters having a topology corresponding to an interconnection map of a process to be controlled, each filter modeling a subprocess of the process. Each filter is interconnected to receive an input vector of process measurements corresponding to a local state of the process and to receive process variables. The filters are adapted to determine a communication failure and responsive to the communication failure, correlations of the local state with the state of subsystems estimated by filters that are not accessible due to the communication failure are set to zero and wherein a local state covariance is increased.

20 Claims, 8 Drawing Sheets

(56) References Cited

OTHER PUBLICATIONS

Olfati-Saber, R., "Distributed Kalman filtering for sensor networks", 46th IEEE Conference on Decision and Control, 2007, 5492-5498.

Olfati-Saber, R., "Flocking for multi-agent dynamic systems: algorithms and theory", IEEE Transactions on Automatic Control, 51(3), (2006), 401-420.

Samar, Sikandar, et al., "Distributed Estimation via Dual Decomposition", Proceedings of the European Control Conference 2007, 1511-1516.

Sanders, C. W, et al., "Specific structures for large-scale state estimation algorithms having information exchange", IEEE Transactions on Automatic Control, 23(2), (1978), 255-261.

Sijs, J., et al., "An overview of non-centralized Kalman filters", IEEE International Conference on Control Applications, 2008. CCA 2008., 739-744.

Stankovic, S. S, et al., "Consensus Based Overlapping Decentralized Estimator", IEEE Transactions on Automatic Control, 54(2), (2009), 410-415.

Vadigepalli, R., et al., "A distributed state estimation and control algorithm for plantwide processes", IEEE Transactions on Control Systems Technology, 11(1), (2003), 119-127.

Zhu, Y., et al., "The optimality for the distributed Kalman filtering fusion with feedback", Automatica, 37(9), (Sep. 2001), 1489-1493.

\* cited by examiner

FIG. 8

COMMUNICATION FAILURE TOLERANT DISTRIBUTED KALMAN FILTER

RELATED APPLICATIONS

This application claims the benefit of priority under 35 U.S.C. Section 119 to European Patent Application Serial No. 11167187.1, filed on May 23, 2011, which application is incorporated herein by reference in its entirety.

BACKGROUND

KF (Kalman Filtering) is an optimal filtering technique commonly utilized for estimating the state variables of a system. Kalman filtering is a time domain operation that is suitable for use in estimating the state variables of time-varying systems that can be described by a set of differential equations with time-varying coefficients. Kalman filtering approaches can be utilized for estimating unknown inputs of specific classes by augmenting the process model by an appropriate input generator.

State estimation in large-scale, discrete-time systems may be modeled as a network of interconnected subsystems. Particular examples of those systems may be plant-wide technological systems consisting of several units that are coupled via media/energy flows or spatially discretized models of distributed parameter systems. One approach to state estimation, i.e., Kalman filtering, is highly resource demanding (on cpu time, memory). The problem is to obtain a stable suboptimal algorithm distributed among several processing units whose number and connection topology corresponds to that of the process model. Distributing the computation load among several computing units is one issue. Another, equally important problem is reducing the overall communication among the units. Distributed implementations of Kalman filter require the units to exchange data not only with their respective neighbors in the network, but also with all other units, creating thus a significant communication overhead, and a potential failure mode when the communication link between local units is broken.

SUMMARY

A method and system include a distributed network of filters having a topology corresponding to an interconnection map of a process to be controlled, each filter modeling a sub-process of the process. Each filter is interconnected and receives a vector of process measurements corresponding to a local state of the process. The filters communicate with other filters—network neighbors. In the process of this peer-to-peer communication, the filters refine their estimates. The filters are adapted to determine a communication failure in the peer-to-peer communication and responsive to the communication failure, correlations of the local state with the state of subsystems estimated by filters that are not accessible due to the communication failure are set to zero and a local state covariance is increased. In further response to the communication failure, when a mean value prediction of a particular interconnection input cannot be obtained from an upstream neighbor, a model of this unknown input is changed from one based on white noise correlated with the local state to a colored noise model using a previous sum of the mean estimated by the neighbor and a locally estimated deviation to set the state of the coloring filter.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, a system to be controlled is modeled by filters that correspond to the arrangement subsystems representing the system. The filters are Kalman filters, in one embodiment, that communicate with each other and provide predictions of the state of the subsystems at desired times. When communications break down such that certain information that includes estimates of interconnection variables as well as internal filter data to be shared with other filters, is not available to a given filter or filters, co-variances used by the filters are modified, and an unknown observer model may be used to replace interconnection inputs.

Figure 1:
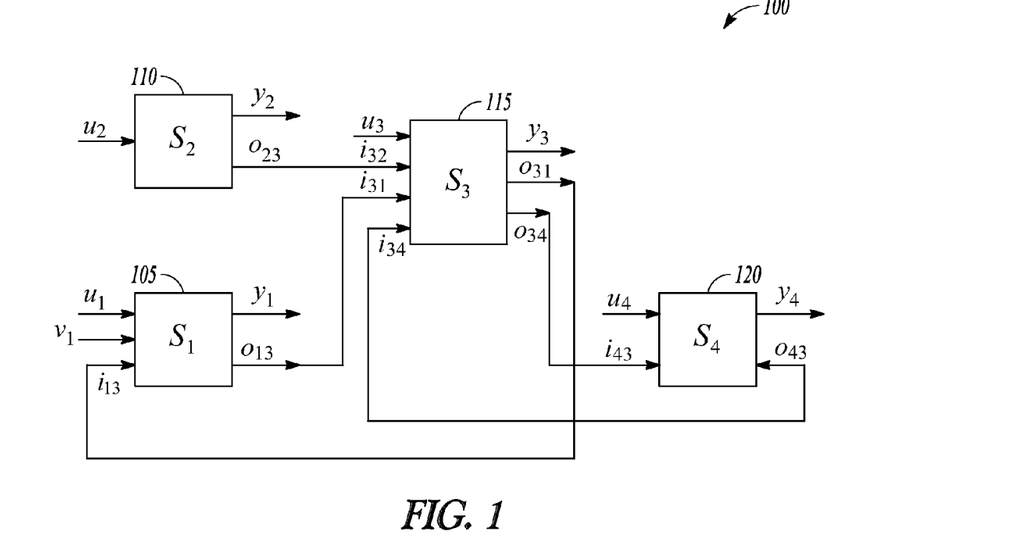
FIG. 1 is a block flow diagram illustrating an example portion of a controlled system having multiple subsystems according to an example embodiment.

FIG. 1 is a block flow diagram illustrating an example portion of a system 100 that includes a network of interconnecting subsystems $S_1$ at 105, $S_2$ at 110, $S_3$ at 115 and $S_4$ at 120. In some systems, there may be many more subsystems than are illustrated in this example. The interconnected subsystems may be thought of as processing units that are connected by flows of materials and/or energy. Alternatively, the overall process may be thought of as a finite dimensional representation of a distributed parameter system where the individual subsystems may represent sub-domains of the overall problem domain and the interconnections describe internal boundaries and related boundary conditions. Several inputs and outputs are shown at each subsystem, including for instance "u", "y", "v", "o", and "i" with corresponding integer subscripts. For example, $u_1$, represents a control input, such as a controller manipulated variable provided to subsystem S1 at 105. $y_1$, corresponds to a measurement of subsystem S1. $v_1$, corresponds to a measured disturbance provided to S1. $o_{13}$, corresponds to an interconnection output of S1 provided to S3. The subscripts are used to identify the originating and receiving subsystem for outputs. $i_{13}$, corresponds to an input to S1 provided by S3. The subscripts are used to identify the receiving and originating subsystem for inputs. There are several more inputs and outputs shown for the different subsystems in FIG. 1 with corresponding subscripts.

Figure 2:
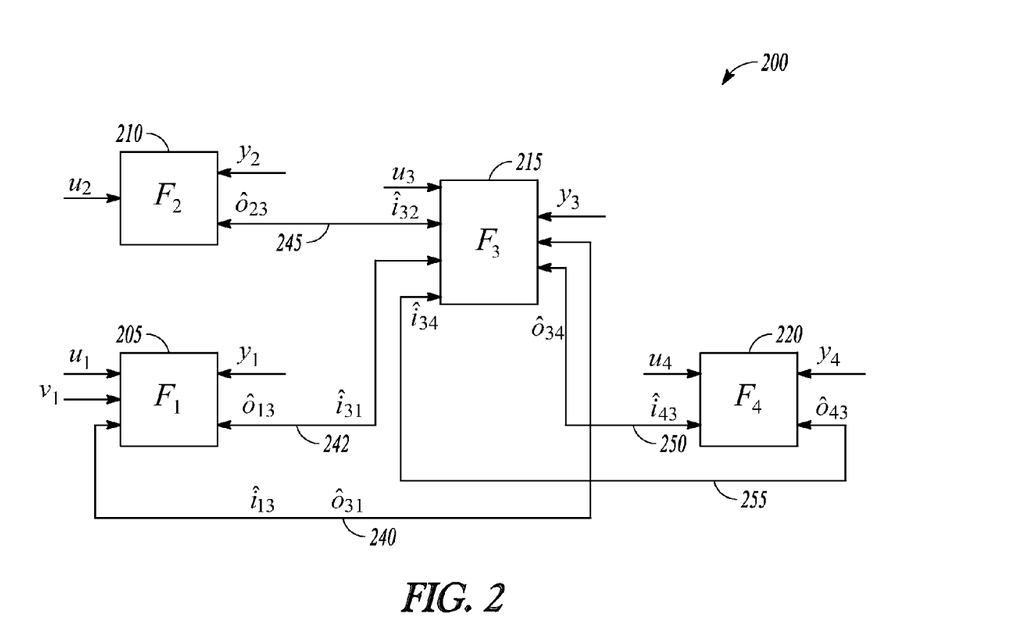
FIG. 2 is a block diagram illustrating an example Kalman filter network corresponding to the controlled system of FIG. 1.

FIG. 2 is a block diagram illustrating a Kalman filter network 200 corresponding to the system 100. The external inputs are repeated (as, e.g., u1 and v1). Measured process outputs from physical systems are provided to the corresponding filters, F1 at 205, F2 at 210, F3 at 215, and F4 at 220. For example, process measurement output $y_1$ of FIG. 1 is provided as an input to filter F1 at 205 in FIG. 2. Thus, the filters do not have the complete process data. In some cases, a particular subsystem may not provide any process measurement data such that the corresponding filter has no direct access to process data (this particular case is not depicted in FIG. 2.) The lack of process information is compensated by filter-to-filter communication exchange in which part of the local information is shared with other filters. This communication takes place between filters whose corresponding subsystems are connected by an interconnection variable. There is a bi-directional communication link between filters corresponding to each interconnection between subsystems. The shared data include local estimates of the particular interconnection variable as well as a number of internal filter data, mostly related to locally estimated covariance/cross-covariance of local variables with certain network variables.

Also illustrated in FIG. 2 are two way communication lines, such as line 240 shown connecting F1 and F3, line 242 connecting F3 and F1, line 245 connecting F2 and F3, line 250 connection F3 and F4, and line 255 connecting F3 and F4. These two way communication lines, are used to facilitate communication of matrices or vectors of data between filters, corresponding to the inputs i and outputs o shown in FIG. 1.

The filters in FIG. 2 are each local filters that have access to local measurements and estimate a local state and interconnection inputs. The interconnection outputs are estimated implicitly, as functions of the local state. These interconnection variable estimates are the overlaps in estimation spaces of neighboring filters. Coupling variable estimates are used as additional measurement for neighboring filters. A data update step proceeds iteratively, in which local filters exchange data with neighboring filters utilizing the filter-to-filter communication lines. However, when communication lines fail, as sometimes happen, the filters adapt as described below to continue operating and estimating without being able to receive data via the failed communication line. In an alternative embodiment, process measurements may be communicated from a subsystem Si not only to a local filter Fi, but to a set of filters in close network distance to Fi.

Figure 3:
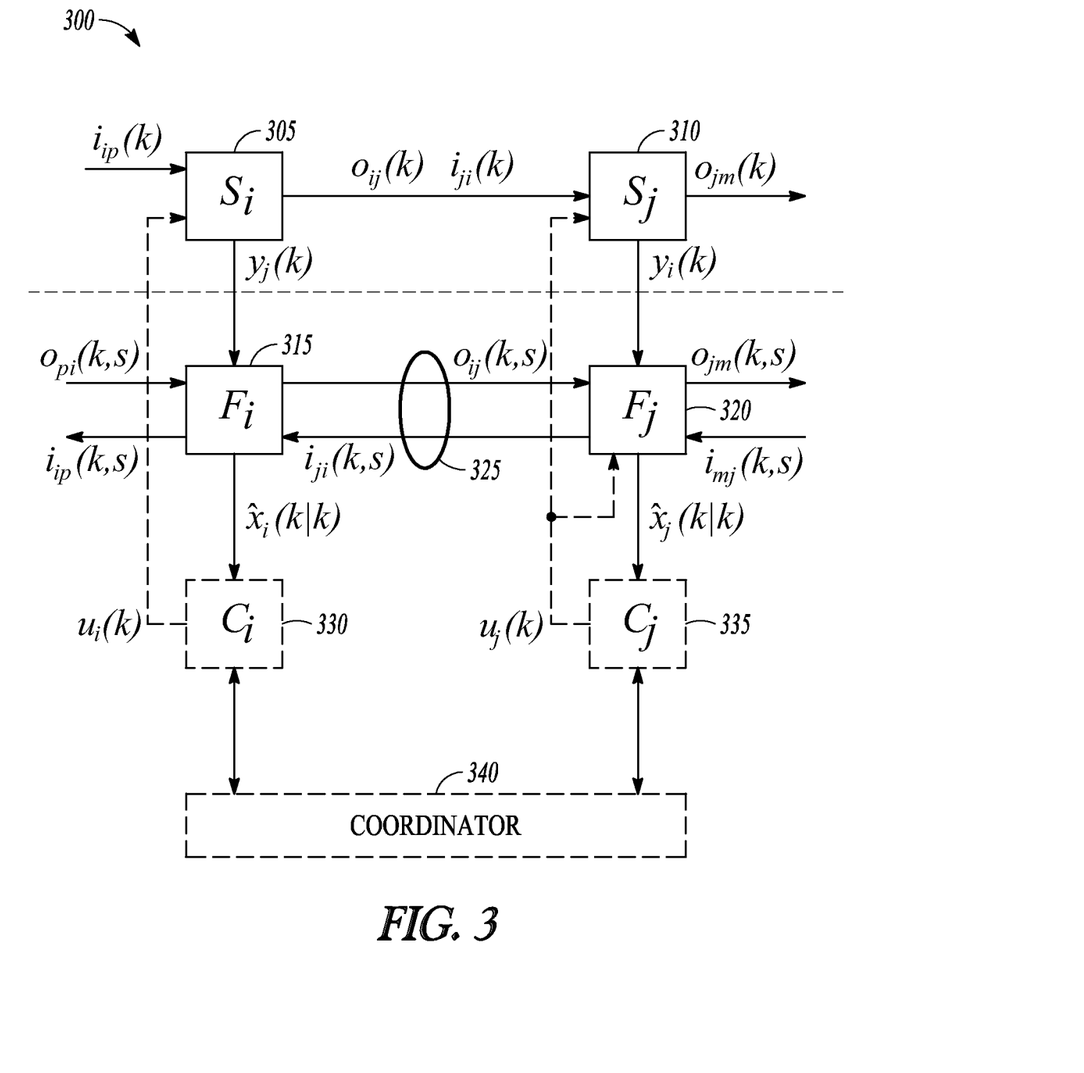
FIG. 3 is a block diagram representation of a portion of a control system illustrating interconnected processes using subsystems, filters, and controller according to an example embodiment.

FIG. 3 is a block diagram representation of a portion of a control system 300 illustrating interconnected processes using subsystems $S_i$ at 305 and $S_j$ at 310. This is a very simplified view where $S_i$ receives an input $i_{ip}(k)$ at a time k, and provides an output $o_{ij}(k)$, which serves an input $i_{ji}(k)$ to $S_j$. $S_j$ provides an output $o_{jm}(k)$ to one or more further subsystems that are not shown. Si provides measurements $y_i(k)$ of the subsystem to a filter $F_i$ at 315, while Sj provides measurements $y_j(k)$ to a filter $F_j$ at 320. $F_i$ and $F_j$ are part of a distributed Kalman filter that consists of a network of local filters whose topology corresponds to an interconnection map (subsystems $S_i$ and $S_j$) of a process to be controlled. In one embodiment, the local filters are basically optimal Kalman filters. Coupling variables 325 between filters are considered by the receiving filter $F_j$ to be the sum of the mean value predicted by the originating filter in the previous time step and a stochastic component—noise, correlated with the local state. These stochastic components are estimated by the local filters and augment the local state. The vector of process measurements of, say, filter Fj, $y_j(k)$ is augmented by coupling variables $o_{ij}(k, s)$ and $i_{mj}(k, s)$. These variables are not, in general, available from the process; hence they are replaced by their estimates obtained from the neighboring filters. The data exchange and estimate update proceeds iteratively, where s denotes the particular iteration. Argument k denotes the discrete time.

A distributed controller 330, 335 orchestrated by a coordinator 340 may be used to provide control inputs $u_i(k)$ and $u_j(k)$ to the filters and subsystems. Other types of controllers may be used in further embodiments, such as a central controller. The filters provide a vector $x_i(k|k)$, $x_j(k|k)$ (current estimates of local process states using the latest process data) to the controller which determines an appropriate control action, represented, in FIG. 3, by signals $u_i(k)$, $u_j(k)$.

Figure 4:
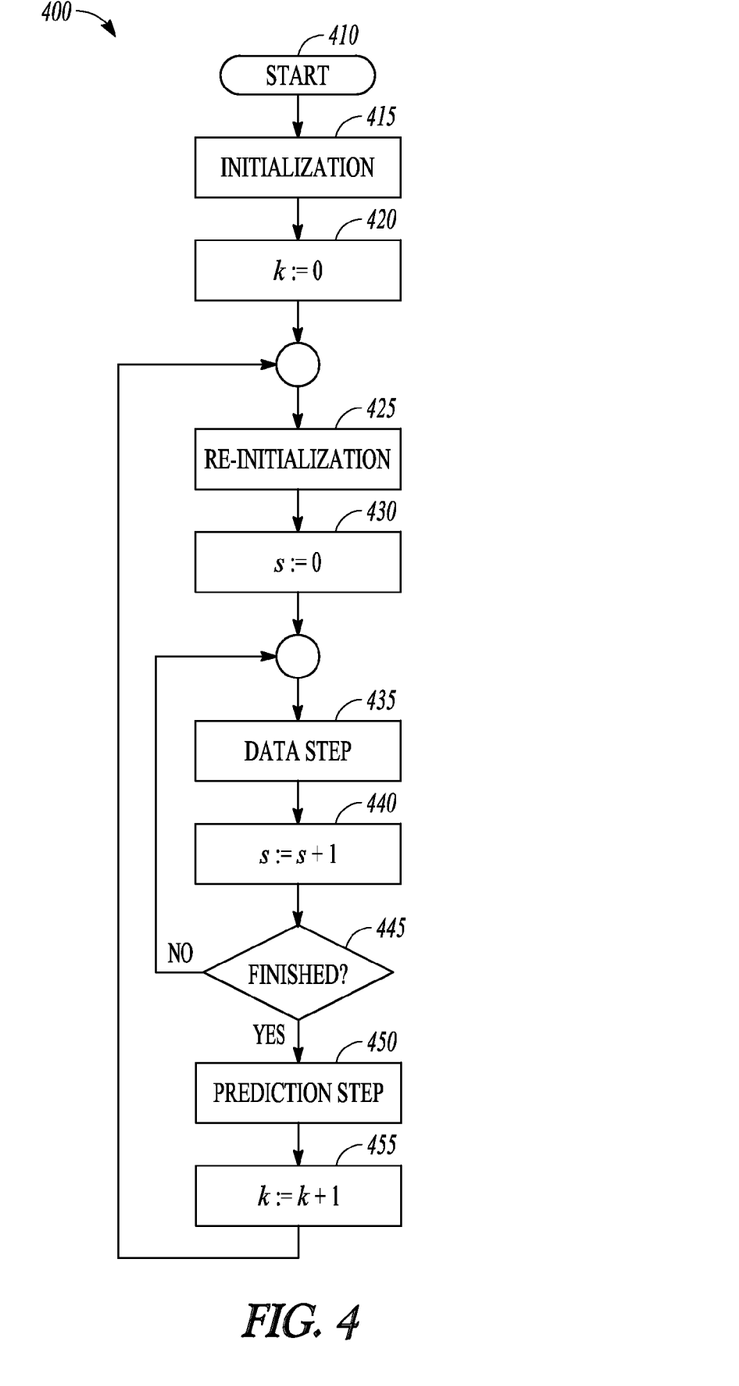
FIG. 4 is a simplified flowchart illustrating a method implemented by a local Kalman filter according to an example embodiment.

FIG. 4 is a simplified flowchart illustrating a method 400 illustrating operation of a local Kalman filter. The method starts at 410 and initialization occurs at 415 to set initial values for states which are to be estimated; further, a topological map of the network is established at each filter, by exchanging information with neighboring filters. During this initialization stage, filters share local process models of their sub-systems. A time, k, is initialized to zero at 420. Re-initialization occurs at 425, and involves communicating with network neighbors, mainly to deliver prediction of the interconnection variable and related covariance/cross-covariance data. Several parts of method 400 include communicating with other filters to obtain values, including during the initialization 415. Each of these parts may encounter failed communication links. When a link has failed, the method may involve finding alternative links through other filters, or setting different values and modifying the operation of the filter to provide the estimates without all the data normally used. Further details of dealing with a failed communication link are described below.

At 430, an iteration count, s, is set to zero, and an iteration begins at 435 until a network wide equilibrium is reached, or the maximum number of iterations is exhausted. To facilitate the synchronization in the communication among filters, these iterations may/can be done at time slots, that are integer fractions of a control interval; iteration counter is incremented at 440. During these iterations, the assumption that the state estimate is independent from the output noise is not satisfied, and appropriate cross-correlations have to be taken into account. The filters receive, during these iterations, estimates of coupling variables made by neighboring filters and fuse this information into its own state estimate in a statistically correct and optimal way.

The filters receive further additional information from network neighbors. The additional information (Kalman gains, certain covariance matrices) is related to sub-processes that are within network radius r (and hence not only immediate network members). Multi-hop communication methods may be used to communicate the additional information. The addition information may be used to a statistically correct update of cross-covariance estimates. If the communication radius is restricted to r, a de-correlation of the local state and outputs with the corresponding variables at a network distance r is done after each iteration, resulting in an increase of the local state covariance matrix. This is done by adding some fictitious noises, whose covariance is varying from one iteration to another. In each iteration, the local unit updates its state mean and covariance, and the cross-covariances of the local variables with corresponding variables related to subsystems within the network radius. For this, each local filter collects, from other systems within the given radius, Kalman gains and covariance data. These data are obtained from the intermediate neighbor in a way of multi-hop communication.

After a network-wide equilibrium is reached (or the maximum number of iteration is exhausted) as determined at 445, a standard prediction 450 is performed—each filter predicts, using the local model, its state mean and state covariance. It further predicts cross-covariances of the local state with other states within the communication radius; for this, their models are used and shared within the communication radius r. The stochastic component of the estimated coupling input is, after the prediction step, reset to zero (as it is assumed to be a white noise). At 455, k is incremented and processing returns to 425.

The above paragraphs describe the normal mode of operation when the communication links between neighboring filters work properly. If some of these links are broken, the algorithm is modified as illustrated in method 500 in FIG. 5. Method 500 may be used at any point when neighbor-to-neighbor communication fails in blocks 425-450 in FIG. 4. At 510, a determination is made as to whether data was received from a link. If it was, the normal process 400 continues at 515. If not, the filter determines that a communication link has failed and starts handling interconnection variables as an unmeasured disturbance. An unmeasured disturbance model for the variable or variables may be used in various embodiments.

Figure 5:
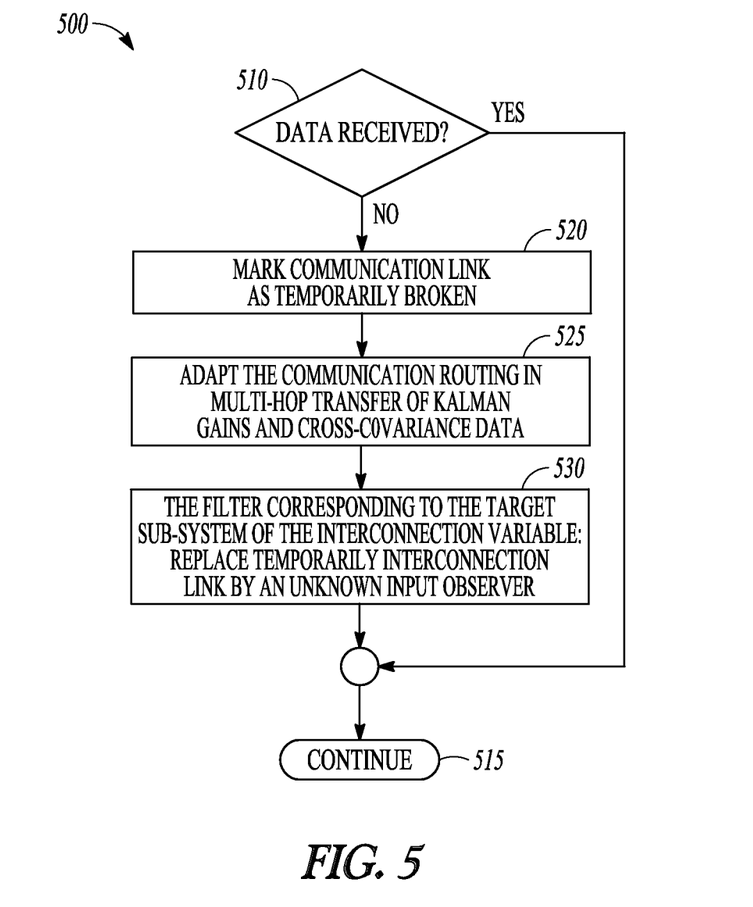
FIG. 5 is a flowchart illustrating a method implemented by a local Kalman filter when a communication link has failed according to an example embodiment.

The filter marks the communication link as temporarily broken at 520, also marking the interconnection variable as broken, and stops using the connection for refining its state. It may also update a local topology model, which may result in some network distances used in multi-hop communications increasing. At 525, communication routing multi-hop transfer of Kalman gains and cross-covariance data is adapted. At 530, the filter corresponding to the target sub-system of the interconnection variable, replaces the interconnection link by an unknown input observer.

Figure 6A:
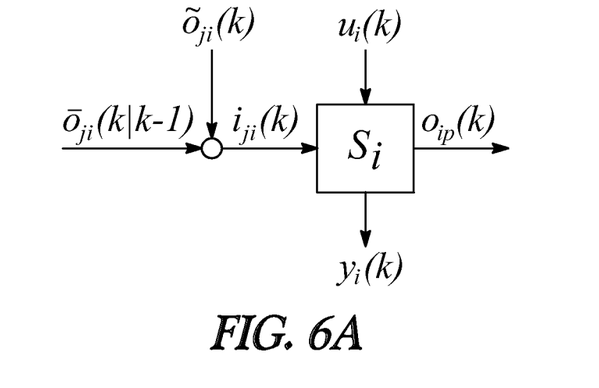
FIG. 6A illustrates a prediction model when interconnection inputs are operating in a normal manner.

FIG. 6A illustrates a prediction model when interconnection inputs are operating in a normal manner. A neighbor's prediction plus noise correlated with a local state and other interconnection variables is received by a filter. Noise is estimated along with the local state.

Figure 6B:
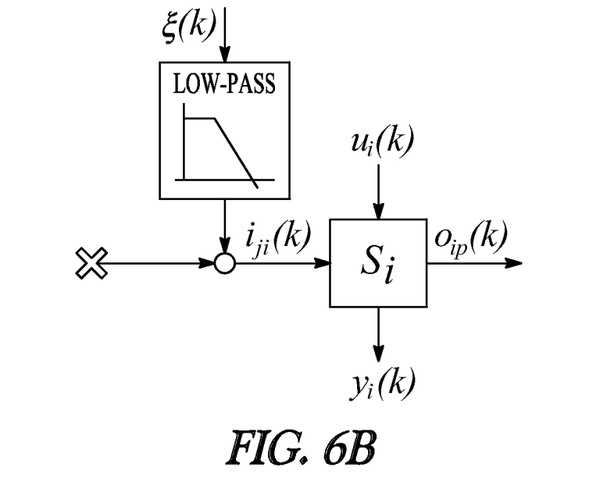
FIG. 6B illustrates the prediction model of FIG. 6A when an interconnection output is not received due to a broken communication link.

FIG. 6B illustrates the prediction model when an interconnection output is not received due to a broken communication link. A classical unknown input observer with colored noise is utilized.

Figure 7A:
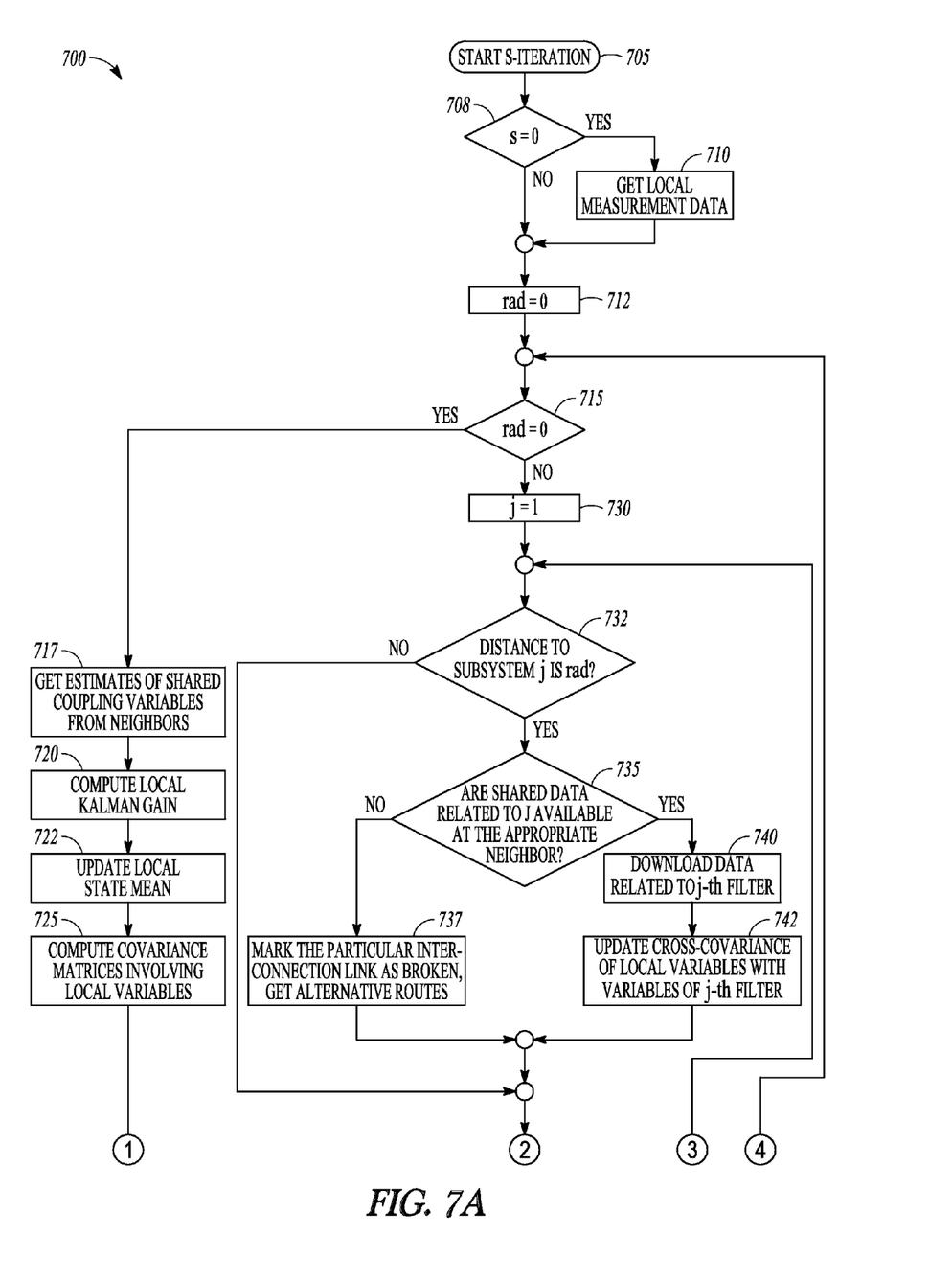
FIGS. 7A and 7B are a detailed flowchart illustrating iteration by the filters to provide estimates according to an example embodiment.
Figure 7B:
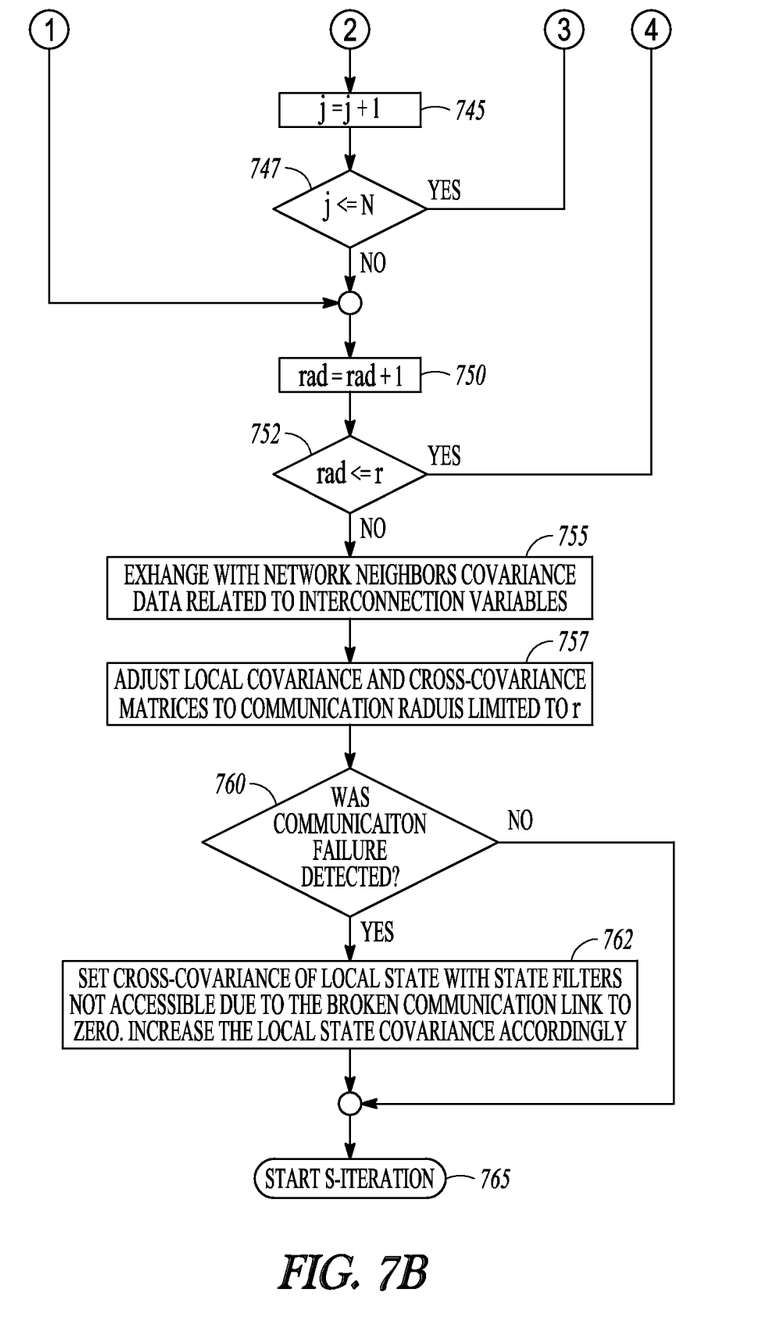

FIGS. 7A and 7B are a detailed flowchart illustrating a portion 700 of method 400 where iteration occurs over "s", corresponding to blocks 225-445 in FIG. 4. At 705, iteration is started using s as a counter construct. At 709, s is initialized and set to 0. At 710, local measurement data is obtained. At 712, a representation of a communication radius, rad, is initialized and set to zero. Rad serves as an indication of the radial distance in hops, or other measurement, serving to define how large a neighborhood is for a given filter. At 710, if rad=0, estimates of shared coupling variables are obtained from neighbors at 717. A local Kalman gain is computed at 720, a local state mean is updated at 722, and covariance matrices involving local variables is computed at 725.

If rad was not equal to 0 at 715 (which means, if it is greater than 0), then, there is a loop 732-752 which is passed once for each filter j that is in the network distance equal to rad from the filter under consideration. This is decided, based on the internally stored network map. Based on this map, the network neighbor (denoted as, e.g., s) is specified, via which the relevant data on filter j are downloaded. Notice that the network distance from s to j is (assuming no communication failure taking place) equal to rad−1, and hence, the above mentioned relevant data should have been available at Filter s from the previous time slot. For the sake of simplicity, the flowchart shows that filters within the network radius r from the filter under consideration are labeled by index j=1, 2, ... N, N being the number of filters that are 'visible' for the local filter. The index j, is set to 1 at 730, and at decision block 732, a determination is made whether the distance to a subsystem j is equal to rad. If it is equal, at 735, a determination is made whether shared data related to j is available at an appropriate neighbor. If not, the corresponding interconnection link is marked as broken at 737, and alternative routes are obtained, if available. This means that the distance of j-th filter may be greater then rad, and the steps 735-742 may be repeated for j-th filter in a further pass for increased rad. It may happen that a particular j-th filter will not be accessible. That case will be handled appropriately in step 762, after data from the accessible filters are processed If the answer in the if-block 735 is yes, the data related to the j-th filter is downloaded at 740 and the cross covariance of local variables is updated with variables of the j-th filter. Processing continues from multiple paths, including blocks 732, 737, and 742, at 745, where j is incremented, and then compared at 747 to determine whether j is less than or equal to N, which means, whether all filters in the network that the local filter is aware of have been tested for being in the network distance equal to rad and their data eventually processed. If yes, processing returns to 732 to continue.

Otherwise, processing proceeds to block 750, where rad is incremented. Block 750 is also proceeded to from block 725 following computing of the covariance matrices for local variables. Then, it is determined at 752, whether rad is less than or equal to r, the maximum communication radius. If yes, processing returns to block 715. If not, then processing proceeds to 755, where covariance data related to interconnection variables is exchanged with network neighbors. At 757, local covariance and cross-covariance matrices are adjusted to communication radius limited to r. At 760, a determination is made whether a communication failure was detected. If yes, at block 762, the cross-covariance matrices that could not be updated due to the reduced connectivity of the multi-hop communication process are set to zero and the state covariance matrix is increased. At 765, the s-iteration ends.

In summary, a distributed Kalman filter system includes a distributed network of filters having a topology corresponding to an interconnection map of a process to be controlled. Each filter is connected to receive a vector of process measurements corresponding to a local state of the process and to receive process variables. Each filter is aware of the topology of the network up to the network radius r and of models of the sub-processes within the same radius. Each filter modeling sub-process has coupling inputs as sums of received mean values predicted by neighboring filters, and noise, correlated with the local state of the filter. Each filter operates in iterations and communicates repeatedly within these iterations with its network neighbors. These iterations with multiple inter-filter communications and synchronizations are best realized time slots that are fractions of a normal control period. The filters receive estimates of coupling variables made by neighboring filters and fuse this information into its own state estimate in a stochastically optimal way. The filters also receive from network neighbors further information (Kalman gains, certain covariance matrices) related to sub-processes that are within network radius r (and hence not only immediate network members) in a way of multi-hop communication, and using these data for statistically correct update of cross-covariance estimates. Compensation is performed for limited communication radius by increasing local state covariance estimate ("projecting uncertainty due to neglecting network dynamics that is distant (in a network connection graph sense) onto the local covariance") and after performing a number of data updates (filtering steps), performing, in the sub-sequent time slot, a one-step ahead prediction of the local state mean covariance and cross-covariance with other states within the network radius r wherein the filters are adapted to determine a communication failure and responsive to the communication failure, correlations of the local state with state of subsystems estimated by filters that are not accessible due to the communication failure are set to zero and at the same time, the local state covariance is suitably increased. In a further response of the filters to the communication failure, when a mean value prediction of a particular interconnection input cannot be obtained from an upstream neighbor, the model of this unknown input is changed from one based on white noise correlated with the local state to a colored noise model using a previous sum of the mean estimated by the neighbor and the locally estimated deviation to set the state of the coloring filter.

A description of a distributed estimation algorithm used by the filters is now described for background information. It includes a description of the structure and estimation step.

The distributed estimator consists of a network of Kalman filters—one Kalman filter (KF) agent per subsystem. The agents rely on local process measurements. Coupling inputs are modeled as stochastic variables whose mean and covariance are supplied by neighboring agents. In particular, $$i_{ij}(k) = \bar{o}_{ji}(k|k-1) + \theta_{ij}(k) \forall k=0, 1, \ldots; \forall i; \forall j \in N_i. \quad (1)$$

There, $\bar{o}_{ji}(k|k-1) = C_{oji}E(x_j(k)|k-1)$ is the conditional mean of the particular output of $j^{th}$ KF. Symbol E denotes the expected value. Variable $\theta_{ij}$ is a Gaussian noise with a priori zero mean and conditional covariance $C_{oji}E((x_j(k) - \bar{x}_j(k|k-1))(x_j(k) - \bar{x}_j(k|k-1))^T|k-1)C_{oji}^T$. Noise 74 $_{ij}$ is treated as process noise by $i^{th}$ KF. Note however, that it is correlated with local state $x_i$; therefore, value of $\theta_{ij}$ can be estimated along $x_i$ with by $i^{th}$ KF. Variables $\theta_{ij}$, for all $j \in N_i$, thus augment the local state.

Local filter number i then estimates all interconnection outputs $o_{ip}$ (as functions of its state) and, for all j, inputs $i_{ij}$ as the sum of the mean supplied by $j^{th}$ KF and variable $\theta_{ij}$ as an element of the local augmented state. Hence, interconnection variables are estimated simultaneously by two neighboring filters. The idea behind the distributed filter is that the coupling variables are treated by local filters as measured process variables. Instead of the real process data, the estimates provided by neighboring filters are used. After one data update step, local KFs modify their states using data from their neighbors. The local estimates of interconnection variables change; then, the new estimates are exchanged and the update is repeated, until a network-wide equilibrium is reached. The KF filtering step thus proceeds in an iterative way; let the iteration within one time step k be indexed by variable s.

Local filters take into account the correlations between coupling variables as augmented measurements and the local state in order to update the local state covariance correctly. In order to keep track on this correlation, the agents have to record and update covariance matrices of the local state with all other states in the network, conditioned by data up to time k and iteration s.

After the termination of s-iterations, a standard prediction step occurs by incrementing time-step k. To predict the local state mean and covariance, a process model is used; to predict covariance matrices with other states, models of other subsystems in the network are needed.

The algorithm outlined above shall be described in the following section in more detail. It shall be noted that although the local agents are optimal Kalman filters, the overall distributed filter is generally not—although in certain cases, the globally optimal KF can be achieved in this distributed framework. The main drawback of this approach is a significant communication overhead and the need for local filters to know the global model and the network topology.

Basic Distributed Estimation Algorithm

This section describes $k^{th}$ time step of $i^{th}$ local KF.

Re-initialization

The data update (filtering) step of KF starts from variables predicted locally in the previous time-step: the local state mean $\bar{x}_i(k|k-1)$, its covariance $P_{ii}(k|k-1)$ and cross-covariance matrices with other subsystem states $P_{ij}(k|k-1)$. Then, as was mentioned above, the local state is augmented by the coupling input variations (see $$i_{ij}(k) = \bar{o}_{ji}(k|k-1) + \theta_{ij}(k) \forall k=0, 1, \ldots; \forall i; \forall j \in N_i. \quad (2),$$

i.e., $$X_i = [x_i^T | \theta_{ij_1}^T \ldots \theta_{ij_n}^T], j_1, \ldots, j_n \in N_i \quad (3)$$

A projection operator is used to obtain the coupling input variation from the augmented state as $\theta_{ij} = E_{vij}X_i$. Means $\bar{\theta}_{ij}(k|k-1)$ are initialized to zero. Moreover, predicted coupling inputs, i.e., $\bar{i}_{ij}(k|k-1) = C_{oji}\bar{x}_j(k|k-1)$, are downloaded from the neighbors. Cross-covariance matrices of state variables are denoted as $$M_{ij}(k|k-1) = E(\tilde{X}_i(k|k-1)\tilde{X}_j(k|k-1)^T|k-1), \quad (4)$$

where $\tilde{X}_j(k|k-1) = X_j(k) - \bar{X}_j(k|k-1)$. The covariance $M_{im}(k|k-1)$ is given, for all m and i, as follows (omitting the argument $(k|k-1)$):

$$M_{im} = \begin{bmatrix} P_{im} & P_{is_1}C_{os_1m}^T & \cdots & P_{is_n}C_{os_nm}^T \\ C_{ol_1i}P_{l_1m} & C_{ol_1i}P_{l_1s_1}C_{os_1m}^T & \cdots & C_{ol_1i}P_{l_1s_n}C_{os_nm}^T \\ \vdots & \vdots & \ddots & \vdots \\ C_{ol_ki}P_{l_km} & C_{ol_ki}P_{l_ks_1}C_{os_1m}^T & \cdots & C_{ol_ki}P_{l_ks_n}C_{os_nm}^T \end{bmatrix}, \quad (4)$$

where $s_1, \ldots, s_n \in N_m$ and $l_1, \ldots, l_k \in N_i$. The first block of rows in (4) is obtained from local data; further rows are imported from neighbors $l_1$ to $l_k$.

The data step of the local filter proceeds iteratively for $s=1, 2, \ldots$ by updating the conditional mean $\bar{X}_i(k, s|k, s-1)$ and covariance $M_{ij}(k, s|k, s-1)$ for $j=1, \ldots, N$. The starting values associated with $s=0$ are $$\bar{X}_i(k, 0|k, -1) = \bar{X}_i(k|k-1),$$

$$M_{ij}(k, 0|k, -1) = M_{ij}(k|k-1) \forall j. \quad (4)$$

The data used for the local update in $s^{th}$ step (measurements plus estimates of coupling inputs/outputs from adjacent agents) are given by $$Y_i(k,s) = \begin{bmatrix} y_i(k) \\ \overline{o}_{l_1 i}(k,s|k,s-1) \\ \vdots \\ \overline{o}_{l_k i}(k,s|k,s-1) \\ \overline{\partial}_{ij_1}(k,s|k,s-1) + \overline{o}_{j_1 i}(k|k-1) \\ \vdots \\ \overline{\partial}_{ij_m}(k,s|k,s-1) + \overline{o}_{j_m i}(k|k-1) \end{bmatrix} \quad (5)$$

The prediction error can be expressed as $$Y_{Ei}(k,s|k,-1) = \begin{bmatrix} y(k) - C_{yi}\overline{x}_i(k,s|k,s-1) \\ \vdots \\ \delta_{il}(k,s|k,s-1) \\ \vdots \\ \delta_{ji}(k,s|k,s-1) \\ \vdots \end{bmatrix}, \quad (6)$$

where, variables $\delta_{ij}(k, s|k, s-1)$ are defined as $$\delta_{ij}(k,s|k,s-1) = C_{oij}\overline{X}_j(k,s|k,s-1) - E_{vij}\overline{X}_i(k,s|k,s-1) - C_{oji}\overline{X}_j(k|k-1). \quad (7)$$

Notice that as follows from the above initialization rules, there holds $\delta_{ij}(k, 0|k,-1)=0$.

Finally, let us introduce the following notation:

$$H_{ij}(k,s|k,s-1) = E(\tilde{X}_i(k,s|k,s-1)\tilde{Y}_{Ej}(k,s|k,s-1)^T|k,s-1),$$

$$W_{ij}(k,s|k,s-1) = E(\tilde{Y}_{Ei}(k,s|k,s-1)\tilde{Y}_{Ej}(k,s|k,s-1)^T|k,s-1). \quad (8)$$

Initial values of these covariance matrices can be easily obtained from the local state covariance.

Data Update in Step s

The first step in the data update of the local filter in iteration s is to determine the local Kalman gain as a minimum-norm solution of the (possibly singular) linear equation $$K_i(k,s)W_{ii}(k,s|k,s-1) = H_{ii}(k,s|k,s-1). \quad (8)$$

The local state mean update is given by $$\overline{X}_i(k,s+1|k,s) = \overline{X}_i(k,s|k,s-1) + K_i(k,s)Y_{Ei}(k,s|k,s-1). \quad (9)$$

The local state covariance is obtained as $$M_{ii}(k,s+1|k,s) = M_{ii}(k,s|k,s-1) - K_i(k,s)W_{ii}(k,s|k,s-1)K_i(k,s)^T. \quad (9)$$

State cross-covariance is obtained, for all $j \neq i$ as $$M_{ij}(k,s+1|k,s) = M_{ij}(k,s|k,s-1) - K_i(k,s)H_{ji}(k,s|k,s-1)^T - H_{ij}(k,s|k,s-1)K_j(k,s)^T + K_i(k,s)W_{ij}(k,s|k,s-1)K_j(k,s|k,s-1)^T. \quad (10)$$

To update this cross-covariance, matrices $H_{ji}$ and $K_j$ are obtained from subsystem j. To avoid the agents talking to every other ones, gains $K_i$ are, together with the state-to-output covariance matrix $H_{ij}$, propagated from agent to agent along the interconnection links. Hence, the update (10) is done in m successive steps, where m is the largest network distance. At $r^{th}$ step, Kalman gains of all agents j such that $d(i,j)=r$ are downloaded from network neighbors along with state-to-output covariance matrices $H_{js}$, $d(j,s) \geq r$. Upon receiving these data, update (10) can be computed. The data exchange has to be pre-planned to avoid duplicate broadcasts. Nonetheless, it is obvious that the volume of data transferred over the network can be prohibitive in certain applications. This problem is addressed by restricting the maximum network distance r which requires covariance adjustments.

Finally, covariance matrices in (8) have to be updated. However, they are not obtained from state covariance matrices in a straightforward way, as are for s=0. The reason is that state $X_i(k, s|k, s-1)$ is, for s>0, correlated with measurement noise. To obtain a better insight into the dynamics of the covariance matrices involved, we shall resort to a global view on the distributed filter. Let $\tilde{X}$ and $\tilde{Y}_E$ denote vectors of containing all centered augmented states and estimation errors, respectively. Let $E_{Xi}$ and $E_{yi}$ be projection operators so that $\tilde{X}_i = E_{Xi}\tilde{X}$ and $\tilde{Y}_{Ei} = E_{Yi}\tilde{Y}$. Further, we introduce matrices K and $C_E$ so that $$E_{Xi}KE_{Yj}^T = \begin{cases} K_i & \text{if } i=j \\ 0 & \text{otherwise} \end{cases} \quad (10)$$

and $\tilde{Y}_E = C_E\tilde{X}$. Note that $C_E$ is a highly structured matrix; in particular, $E_{Yi}C_E E_{Xj}^T = 0$ if $d(i,j) > 1$. Let matrix $$Z = \begin{bmatrix} M & H & U \\ H^T & W & V \\ U^T & V^T & R \end{bmatrix} \quad (10)$$

denote the joint covariance matrix of vector $[\tilde{X}^T \; \tilde{Y}_E^T \; \eta^T]$ where $\eta$ is the global measurement noise. Then, the recursive formula for covariance matrix (10) resulting from the repeated data update step is given by $$Z(k,s+1|k,s) = \psi(k,s)Z(k,s|k,s-1)\psi(k,s)^T. \quad (11)$$

There, matrix $\psi(k, s)$ is given by $$\psi(k,s) = \begin{bmatrix} I & -K(k,s) & 0 \\ C_E & -C_E K(k,s) & E_y \\ 0 & 0 & I \end{bmatrix}, \quad (12)$$

where $E_y$ is a projection operator extracting 'real' process measurement errors from vector $\tilde{Y}_E$. Initial settings for covariance matrices involving measurement noise are $U(k|k-1)=0$ and $E_y V(k|k-1)=R$, $E_Y^T V(k|k-1)=0$. Using straightforward manipulations, we can extract from equation (11), under the specific initialization, an independent autonomous subsystem involving only matrices w and H as follows:

$$\begin{bmatrix} H(k,s+1|k,s) \\ W(k,s+1|k,s) \end{bmatrix} = \begin{bmatrix} I & -K(k,s) \\ 0 & \phi(k,s) \end{bmatrix} \begin{bmatrix} H(k,s|k,s-1) \\ W(k,s|k,s-1) \end{bmatrix} \phi(k,s)^T, \quad (12)$$

where $\phi(k,s) = I - C_E K(k,s)$. This equation drives the s-iterations; updates of state covariance matrices in (9) and (9) are dependent on it. Reducing (12) to update the local state-to-global output covariance matrix reduces to $$H_{i\bullet}(k,s+1|k,s) = (H_{i\bullet}(k,s|k,s-1) - K_i(k,s)W_{i\bullet}(k,s|k,s-1))\phi(k,s)^T \quad (13)$$

This requires Kalman gains from other subsystems. Hence, (14) is computed, similarly to (10), in successive steps. As for updating covariance matrix $W_{i\bullet}$: Pre-multiplying by matrix $E_{\gamma_i}\phi$ requires matrices $K_j$ and $W_{i\bullet}$ for all j such that $d(i,j)\leq 1$, i.e., data from all network neighbors. Post-multiplying by $\phi^T$ is done sequentially, in the same way as in the update of $H_{i\bullet}$. As for the convergence, the following Lemma can be easily proven:

Lemma 1. Dynamic equation (12) converges to a steady-state solution. Matrices $\overline{H}$ and $\overline{W}$ are a steady-state solution of (12) if and only if the corresponding gain matrix $\overline{K}$ is zero.

Using this lemma, a stopping criterion for the s-iterations can be based on the norm of $K(k, s)$ being less than a threshold.

Prediction Step

The state mean prediction proceeds according to the formula $$x_i(k+1|k) = \tilde{A}_i X_i(k, \bar{s}+1|k, \bar{s}) + \tilde{B}_i \begin{bmatrix} i_{ij_1}(k, \bar{s}+1|k, \bar{s}) + \delta_{ij_1}(k, \bar{s}+1|k, \bar{s}) \\ \vdots \\ i_{ij_m}(k, \bar{s}+1|k, \bar{s}) + \delta_{ij_m}(k, \bar{s}+1|k, \bar{s}) \end{bmatrix}, \quad (14)$$

where, $\bar{s}$ denotes the last data update iteration and $$\tilde{A}_i=[A_i\tilde{B}_i], \tilde{B}_i=[B_{ij_1}\ldots B_{ij_m}], \{j_1,\ldots,j_m\}=N_i. \quad (14)$$

The predicted covariance is given by $$P_{im}(k+1|k)=\tilde{A}_i M_{jm}(k,\bar{s}+1|k,\bar{s})\tilde{A}_m^T+\tilde{B}_i E_{\delta im}\times H_{mN_i}^T(k,\bar{s}+1|k,\bar{s})\tilde{A}_m^T+\tilde{A}_i H_{iN_m}(k,\bar{s}+1|k,\bar{s})E_{\delta mi}^T\tilde{B}_m^T+\tilde{B}_i E_{\delta im} W_{N_iN_m}(k,\bar{s}+1|k,\bar{s})E_{\delta mi}^T\tilde{B}_m^T+Q_{0im} \quad (14)$$

There, $H_{iN_m}=[H_{il_1}\ldots H_{il_n}]$ for $\{l_1,\ldots,l_n\}=N_m$; matrix $E_{\delta mi}$ then select columns of $H_{iN_m}$ that correspond to $\delta_{ij_1},\ldots,\delta_{ij_m}$. Analogous definition holds for matrices $H_{mN_i}$, $E_{\delta im}$ and $W_{N_iN_m}$. Matrix $Q_{0im}$ is the process noise covariance.

In the case that the communication radius is restricted to the network distance r, a correction of the resulting covariance matrices needs to be done. It is assumed that for any subsystem in the distance greater than r, there is $M_{ij}=0$ and also $H_{ij}=0$ and $W_{ij}=0$. Note that even though is satisfied at the beginning of an s-iteration, the updated values for argument (k, s+1|k, s) this may not hold, at least for network distance r+1. We shall not merely re-set these covariance matrices to zero: we also increase local covariance matrices $M_{ii}$ and $W_{ii}$. The goal is to have the global joint covariance matrix (10) no smaller than it was prior this adjustment, and still as small as possible (in the matrix inequality sense). This can be interpreted as adding fictitious noises to the network in particular places and of particular stochastic properties; this increased uncertainty thus compensates for the information loss due to the restriction of the communication radius. These operations can be done in the distributed way.

As described above, if communications are down, an unknown observer model may be used to replace information that can no longer be obtained from neighboring filters, and the same algorithm may be used to generate the estimations.

Figure 8:
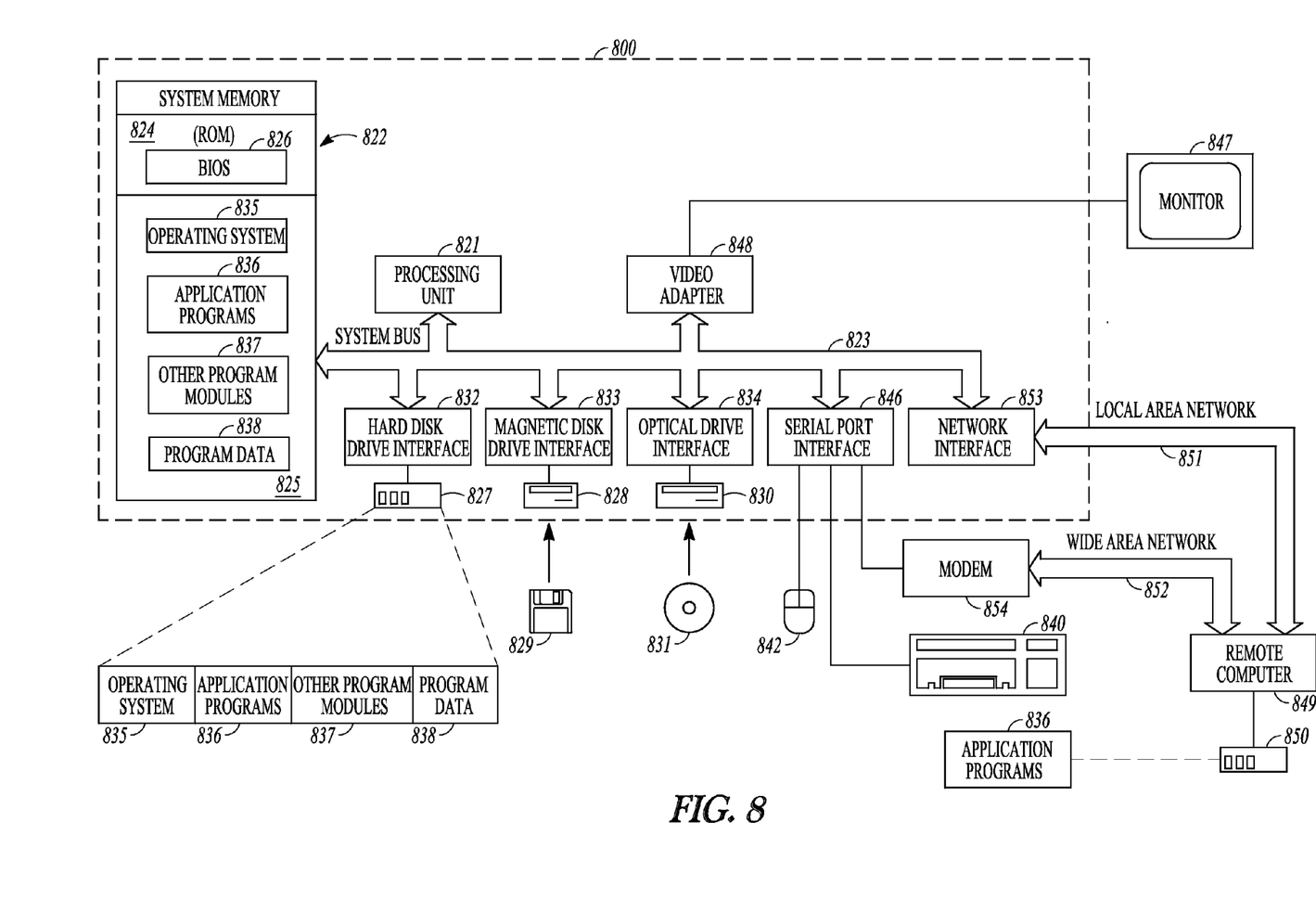
FIG. 8 is a block diagram of a computer system to execute filter methods according to an example embodiment.

FIG. 8 is a block diagram of a computer system to implement methods according to an example embodiment. In the embodiment shown in FIG. 8, a hardware and operating environment is provided that is applicable to implementing any of methods, filters, subsystems, and controllers shown in the other Figures.

As shown in FIG. 8, one embodiment of the hardware and operating environment includes a general purpose computing device in the form of a computer 800 (e.g., a personal computer, workstation, or server), including one or more processing units 821, a system memory 822, and a system bus 823 that operatively couples various system components including the system memory 822 to the processing unit 821. There may be only one or there may be more than one processing unit 821, such that the processor of computer 800 comprises a single central-processing unit (CPU), or a plurality of processing units, commonly referred to as a multiprocessor or parallel-processor environment. In various embodiments, computer 800 is a conventional computer, a distributed computer, or any other type of computer.

The system bus 823 can be any of several types of bus structures including a memory bus or memory controller, a peripheral bus, and a local bus using any of a variety of bus architectures. The system memory can also be referred to as simply the memory, and, in some embodiments, includes read-only memory (ROM) 824 and random-access memory (RAM) 825. A basic input/output system (BIOS) program 826, containing the basic routines that help to transfer information between elements within the computer 800, such as during start-up, may be stored in ROM 824. The computer 800 further includes a hard disk drive 827 for reading from and writing to a hard disk, not shown, a magnetic disk drive 828 for reading from or writing to a removable magnetic disk 829, and an optical disk drive 830 for reading from or writing to a removable optical disk 831 such as a CD ROM or other optical media.

The hard disk drive 827, magnetic disk drive 828, and optical disk drive 830 couple with a hard disk drive interface 832, a magnetic disk drive interface 833, and an optical disk drive interface 834, respectively. The drives and their associated computer-readable media provide non volatile storage of computer-readable instructions, data structures, program modules and other data for the computer 800. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 829, optical disk 831, ROM 824, or RAM 825, including an operating system 835, one or more application programs 836, other program modules 837, and program data 838. Programming for implementing one or more processes or method described herein may be resident on any one or number of these computer-readable media.

A user may enter commands and information into computer 800 through input devices such as a keyboard 840 and pointing device 842. Other input devices (not shown) can include a microphone, joystick, game pad, satellite dish, scanner, or the like. These other input devices are often connected to the processing unit 821 through a serial port interface 846 that is coupled to the system bus 823, but can be connected by other interfaces, such as a parallel port, game port, or a universal serial bus (USB). A monitor 847 or other type of display device can also be connected to the system bus 823 via an interface, such as a video adapter 848. The monitor 847 can display a graphical user interface for the user. In addition to the monitor 847, computers typically include other peripheral output devices (not shown), such as speakers and printers.

The computer 800 may operate in a networked environment using logical connections to one or more remote computers or servers, such as remote computer 849. These logical connections are achieved by a communication device coupled to or a part of the computer 800; other types of communication devices may also be used. The remote computer 849 can be another computer, a server, a router, a network PC, a client, a peer device or other common network node, and typically includes many or all of the elements described above I/O relative to the computer 800, although only a memory storage device 850 has been illustrated. The logical connections depicted in FIG. 8 include a local area network (LAN) 851 and/or a wide area network (WAN) 852. Such networking environments are commonplace in office networks, enterprise-wide computer networks, intranets and the internet, which are all types of networks.

When used in a LAN-networking environment, the computer 800 is connected to the LAN 851 through a network interface or adapter 853, which is one type of communications device. In some embodiments, when used in a WAN-networking environment, the computer 800 typically includes a modem 854 (another type of communications device) or any other type of communications device, e.g., a wireless transceiver, for establishing communications over the wide-area network 852, such as the internet. The modem 854, which may be internal or external, is connected to the system bus 823 via the serial port interface 846. In a networked environment, program modules depicted relative to the computer 800 can be stored in the remote memory storage device 850 of remote computer, or server 849. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. A system comprising:
   a distributed network of filters having a topology corresponding to an interconnection map of a process to be controlled, each filter modeling a sub-process of the process;
   each filter interconnected with other filters to receive input vectors of process measurements from other filters corresponding to their local state of the process;
   wherein the filters are adapted to determine a communication failure and responsive to the communication failure, correlations of the local state with the state of subsystems estimated by filters that are not accessible due to the communication failure are set to zero and wherein a local state covariance is increased; and
   in further response to the communication failure, when a mean value prediction of a particular interconnection input cannot be obtained from an upstream neighbor, the filters are adapted to use an unknown observer model to replace interconnection inputs.

2. The system of claim 1 wherein the unknown observer model changes a model of this unknown input from one based on white noise correlated with the local state to a colored noise model using a previous sum of the mean estimated by the neighbor and a locally estimated deviation to set the state of the coloring filter.

3. The system of claim 1 wherein each filter is aware of the topology of the network up to a network radius r and of models of the sub-processes within the radius r.

4. The system of claim 1 wherein each filter modeling sub-process has coupling inputs as sums of received mean values predicted by neighboring filters and noise, correlated with the local state.

5. The system of claim 4 wherein each filter operates in time slots that are fractions of a normal control period and communicates repeatedly, within these slots with its network neighbors.

6. The system of claim 5 wherein the filters receive estimates of coupling variables made by neighboring filters and fuse this information into its own state estimate in a stochastically optimal way.

7. The system of claim 6 wherein the filters receive from network neighbors further information including Kalman gains and covariance matrices, related to sub-processes that are within network radius r in a way of multi-hop communication, and use these data for statistically correct updating of cross-covariance estimates.

8. The system of claim 7 wherein the filters perform compensation for limited communication radius by increasing a local state covariance estimate.

9. The system of claim 8 wherein after performing a number of data updates, the filters perform, in the sub-sequent time slot, a one-step ahead prediction of the local state mean covariance and cross-covariance with other states within the network radius r.

10. A method comprising:
    receiving input vectors of process measurements at a computer implemented Kalman filter from neighboring filters in a distributed network of computer implemented Kalman filters corresponding to an interconnection map of subsystem of a process to be controlled, wherein the inputs correspond to a local state of the process;
    determining a communication failure;
    responsive to the communication failure, setting correlations of the estimated local state with the state of subsystems estimated by filters that are not accessible due to the communication failure to zero;
    increasing the local state covariance; and
    in further response to the communication failure, when a mean value prediction of a particular interconnection input cannot be obtained from an upstream neighbor, changing a model of this unknown input from one based on white noise correlated with the local state to a colored noise model using a previous sum of the mean estimated by the neighbor and a locally estimated deviation to set the state of the coloring filter.

11. The method of claim 10 wherein the filters are adapted to determine a communication failure and responsive to the communication failure, and wherein the method include setting correlations of the local state with the state of subsystems estimated by filters that are not accessible due to the communication failure to zero and increasing a local state covariance.

12. The method of claim 10 wherein the model changed to is an unknown observer model.

13. The method of claim 10 wherein each filter is aware of the topology of the network up to a network radius r and of models of the sub-processes within the radius r.

14. The method of claim 10 wherein each filter modeling sub-process receives coupling inputs as sums of received mean values predicted by neighboring filters and noise, correlated with the local state.

15. The method of claim 14 wherein each filter operates in time slots that are fractions of a normal control period and communicates repeatedly, within these slots with its network neighbors.

16. The method of claim 15 wherein the filters receive estimates of coupling variables made by neighboring filters and fuse this information into its own state estimate in a stochastically optimal way.

17. The method of claim 16 wherein the filters receive from network neighbors further information including Kalman gains and covariance matrices, related to sub-processes that are within network radius r in a way of multi-hop communication, and use these data for statistically correct updating of cross-covariance estimates.

18. The method of claim 17 wherein the filters perform compensation for limited communication radius by increasing a local state covariance estimate.

19. The method of claim 18 wherein after performing a number of data updates, the filters perform, in the sub-sequent time slot, a one-step ahead prediction of the local state mean covariance and cross-covariance with other states within the network radius r.

20. A system comprising:
- a distributed network of filters having a topology corresponding to an interconnection map of a process to be controlled;
- each filter connected to receive a vector of process measurements corresponding to a local state of the process and to receive process variables;
- each filter being aware of the topology of the network up to the network radius r and of models of the sub-processes within the same radius;
- each filter modeling sub-process coupling inputs as sums of received mean values predicted by neighboring filters, and noise, correlated with the local state; and
- each filter operating in time slots that are fractions of the normal control period and communicating repeatedly, within these slots with its network neighbors;
- the filters receiving estimates of coupling variables made by neighboring filters fusing this information into its own state estimate in a stochastically optimal way;
- the filters receiving from network neighbors further information including Kalman gains and covariance matrices related to sub-processes that are within network radius r in a way of multi-hop communication, and using these data for statistically correct update of cross-covariance estimates, and
- performing compensation for limited communication radius by increasing local state covariance estimate onto the local covariance;
- after performing a number of data updates, performing, in the sub-sequent time slot, a one-step ahead prediction of the local state mean covariance and cross-covariance with other states within the network radius r;
- wherein the filters are adapted to determine a communication failure and responsive to the communication failure, correlations of the local state with state of subsystems estimated by filters that are not accessible due to the communication failure are set to zero and at the same time, the local state covariance is suitably increased; and
- in a further response of the filters to the communication failure, when a mean value prediction of a particular interconnection input cannot be obtained from an upstream neighbor, changing the model of this unknown input from one based on white noise correlated with the local state to a colored noise model using a previous sum of the mean estimated by the neighbor and the locally estimated deviation to set the state of the coloring filter.

* * * * *